United States Patent [19]
Yokoyama

[11] 3,961,315
[45] June 1, 1976

[54] INFORMATION RECORDING SYSTEM

[75] Inventor: Noboru Yokoyama, Tokyo, Japan

[73] Assignee: Canon Kabushiki Kaisha, Tokyo, Japan

[22] Filed: Apr. 11, 1975

[21] Appl. No.: 567,054

Related U.S. Application Data
[63] Continuation of Ser. No. 397,805, Sept. 17, 1973.

[52] U.S. Cl. .................... 340/173 LM; 178/6.6 R; 178/6.7 R; 179/100.3 D
[51] Int. Cl.² ........................................ G11C 13/04
[58] Field of Search ............... 340/173 LT, 173 LM; 178/6.6 R, 6.7 R; 179/100.3 D

[56] References Cited
UNITED STATES PATENTS

| | | | |
|---|---|---|---|
| 3,252,143 | 5/1966 | Sundblad | 340/173 LM |
| 3,466,389 | 9/1969 | Neiswander | 340/173 LM |
| 3,569,944 | 3/1971 | Bigelow | 340/173 LM |
| 3,795,902 | 3/1974 | Russell | 340/173 LM |

*Primary Examiner*—Terrell W. Fears
*Attorney, Agent, or Firm*—Fitzpatrick, Cella, Harper & Scinto

[57] ABSTRACT

An information recording system is disclosed in which a digital information recorded on a recording medium is read out, and the digital information is converted into optical patterns with darker and light densities so as to represent the logic "1" and "0." Thereafter the optical patterns are recorded on a microfilm as the dark and light images which represent the logic "1" and "0" and are available for timing or sync signals.

18 Claims, 7 Drawing Figures

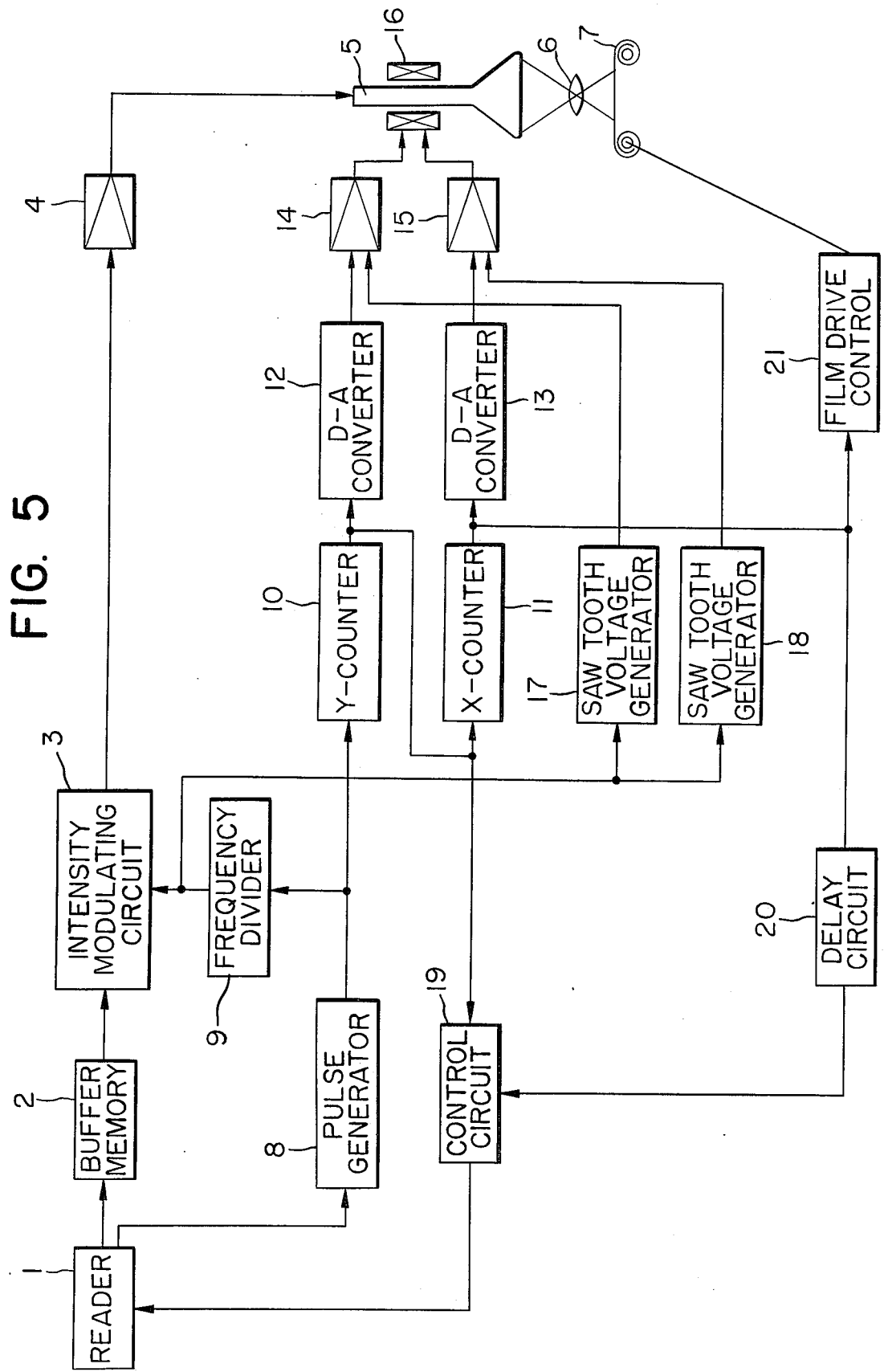

INFORMATION RECORDING SYSTEM

This is a continuation of application Ser. No. 397,805, filed Sept. 17, 1973.

BACKGROUND OF THE INVENTION

1. Field of the Invention

The present invention relates to an information recording system, and more particularly a system for recording computer input information upon a microfilm as optical digital information.

2. Description of the Prior Art

The data processing capabilities of the computers have been remarkably increased because of the improvements of the hard and soft wares, but the input-output devices whose data processing speeds are considerably lower than the speeds of the central processing units so that they present the serious obstacles to the computerization. Furthermore the recording density of the punched cards, punched paper tape and the like is low so that the large storage of these recording media and the protection thereof against destruction also present serious problems.

The computer output microfilmers have been recently developed so that the output data processing speed has been considerably increased, but the conventional punched card readers, paper tape readers or magnetic film readers are still used and the input devices so that the reading speed is considerably lower than the data processing speeds of the central processing units. The improvement of the reading speed of these input devices is limited because they incorporate the mechanical components. Furthermore the recently developed large scale computers make it necessary to record information at a high density, but the conventional input recording media such as punched cards, paper tape or magnetic tape have a very low recording density so that a large space is required for the storage of these recording media especially in a computer center where a large number of programs are stored.

To overcome the above problems, there has been proposed a method in which the data recorded upon a punched card are directly projected upon a microfilm F by utilizing a rotary camera as shown in FIG. 1, but the recording density cannot be improved beyond a certain level. Furthermore the accuracy of the position of data recorded within a frame of the microfilm is poor so that the recorded data cannot be read out with a required degree of accuracy.

The optical digital signals recorded upon the film may be read out in time series by an optical reader such as a flying spot scanner. In this case, timing or sync signals must be utilized in order to indicate the positions of the optical digital signals. Since the relation between the timing or sync signals and the time-sequence output signals of the optical reader reaches the maximum electrically and mechanically stable level of the optical reader as the density of the optical digital signals recorded upon the film is increased, the linear relation between the timing or sync signals and the readout signals is lost so that the correct reading of the optical digital signals becomes impossible.

SUMMARY OF THE INVENTION

The present invention was made to overcome the above problems. One of the objects of the present invention is therefore to provide an information recording system comprising the steps of reading out the digital information recorded upon a recording medium, converting the read out digital information into the optical patterns with darker and light densities so as to represent the logic "1" and "0", a recording said optical patterns upon the microfilm as the dark and light images representing the logic "1" and "0", the density of the light image being darker than the density of the base of the microfilm, and recording the timing or sync signals, which are used when the optical digital information is to be read out, upon the microfilm in the form of the density.

Another object of the present invention is to improve the density of information recorded by the above system. For this purpose, the present invention provides an information recording system comprising the steps of reading out the digital information recorded upon a recording medium; converting the adjacent digits of said read out digital information into the alternate change in intensity of light; converting the logic "1" and "0" into the optical patterns whose width in the recording direction is varied; recording said optical patterns upon the microfilm as the dark and light density images; and recording the timing or sync signals, which are used when the optical digital information is to be read out, upon the microfilm in the form of the density.

BRIEF DESCRIPTION OF THE DRAWINGS

FIG. 5 is a block diagram of a first embodiment of an apparatus for recording the information as shown in FIG. 2;

DESCRIPTION OF THE PREFERRED EMBODIMENT

Figure 1:
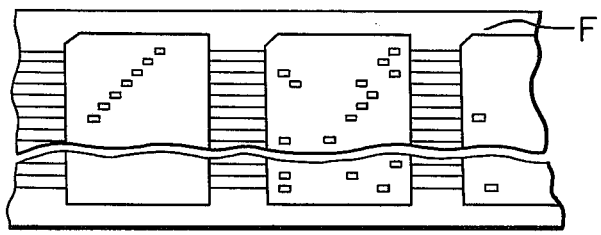
FIG. 1 is a fragmentary top view of a microfilm upon which are recorded the information by the conventional method.

Referring to FIG. 5, reference numeral 1 denotes a reader for reading information recording media such as punched cards, punched paper tape and so on; 2, a buffer memory for storing information in one column; 3, an intensity modulator for converting the information stored in the buffer memory 2 into the time-sequence signals and modulating the logic signal "1" into a predetermined amplitude and the logic signal "0" into an amplitude of a predetermined ratio with respect to the amplitude representing the logic "1", the amplitude representative of the logic "0" being for example one half of the amplitude representative of the logic "1"; 4, an amplifier; 5, a cathoderay tube; 6, optical means such as a lens system; 7, a microfilm 8, a pulse generator; 9, an ½ frequency divider; and 10, an Y counter for controlling the deflection of the beam in the Y direction in the cathode-ray tube 5. The frequency of the pulses generated by the pulse generator 8 is divided into one half by the frequency divider 9 and the pulses by the frequency divider 9 are applied to the intensity modulator 3 so that the information in one column may be converted into the time-sequence signals. The pulses by the pulse generator 8 are also applied to the Y-counter 10 which counts the pulses and is reset when it has counted a predetermined number of pulses. The reset signal is applied to an X-counter 11 which controls the deflection in the X-direction of the beam in the cathode-ray tube 5 and counts the reset pulse signals transmitted from the Y-counter 10. The X-counter 11 is reset when it counts a predetermined number of reset pulse signals. Reference numerals 12 and 13 denote D-A converters in the Y- and X-directions respectively; 14 and 15 denote amplifiers; 16, a deflection coil; 17 and 18, sawtooth generators in the Y- and X-directions, respectively so that a recording width is given to each dark and light image; 19, a reader control circuit; 20, a delay circuit; and 21, a film drive control circuit, to which is applied the drive signal from the X-counter 11. The output signal of the X-counter is also applied through the delay circuit 20 to the control circuit 19 so that when the film 7 is driven the control signal from the Y-counter 11 is interrupted to interrupt the reading by the reader 1.

Next the mode of operation will be described. Digital information recorded on punched cards or the like are read by the reader 1 and stored in the buffer memory 2. When information in one column is read out, the completion signal is generated by the reader 1 and applied to the pulse generator 8 so that the pulses are generated.

The information stored in the buffer memory 2 is transferred into the intensity modulator 3 so that the information is converted into the time-sequence signals in response to the pulse signals and amplitude-modulated. The amplitude-modulated signals are applied through the amplifier 4 to the cathode-ray tube 5 so that they are converted into the optical digital signals whose intensities represent the logic "1" and "0". The film 7 is sensitive to the wavelength of the optical digital signals. The output signals of the Y- and X-counters 10 and 11 are applied through the D-A converters 12 and 13 to the amplifiers 14 and 15, respectively, to which are also applied the sawwave voltages generated by the sawwave generators 17 and 18. The output signals of the amplifiers 14 and 15 are applied to the deflection coils 16 so that the optical digital signals are displayed on the faceplate of the cathode-ray tube 5 at predetermined positions in synchronism with the output signals from the intensity modulators 3.

Figure 2:
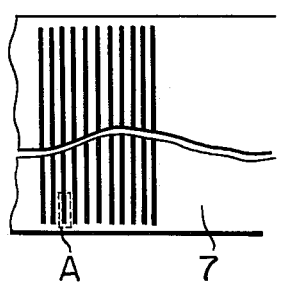
FIG. 2 is a view illustrating a film upon which are recorded the information according to a first embodiment of an information recording system in accordance with the present invention.

The digital signals displayed by the cathode-ray tube 5 are projected through the lens system 6 upon the film 7 and recorded. When the film is developed and fixed, the dark and light code marks are obtained on the film as shown in FIGS. 2 and 3.

Figure 3:
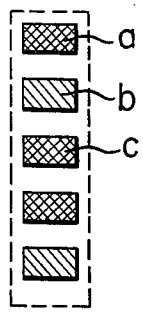
FIG. 3 is a view illustrating, on enlarged scale, a portion indicated by A in FIG. 2.

Referring to FIG. 3, the logic "1" is represented by the dark image a, whereas the logic "0", by the light image b. The ratio among the intensities of the dark image a, the light image b and the base of film c is 1 : 0.5 : 0.1. Instead of this ratio, any suitable ratio may be selected and the intensities may be varied in more than four steps in order to record other information.

The optical digital signals recorded upon the film may be read out in time series by an optical reader such as a flying spot scanner. In this case, timing or sync signals must be utilized in order to indicate the positions of the optical digital signals. Since the relation between the timing or sync signals and the time-sequence output signals of the optical reader reaches the maximum electrically and mechanically stable level of the optical reader as the density of the optical digital signals recorded upon the film is increased, the linear relation between the timing or sync signals and the readout signals is lost so that the correct reading of the optical digital signals becomes impossible.

To overcome this problem, according to the present invention the timing or sync signals are also recorded in addition to the optical digital signals. The timing or sync signals are also variable-density signals.

Figure 4:
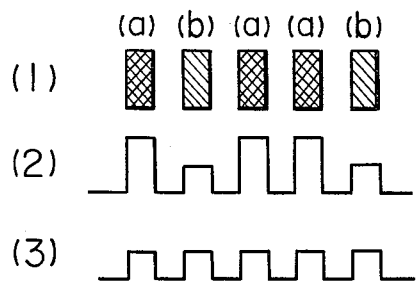
FIG. 4 shows the waveforms of the electrical signals when the digital information recorded upon the film shown in FIG. 2 is read out.

FIG. 4 shows the waveforms when the optical digital signals recorded on the film are read out. FIG. 4(1) shows the optical digital signals recorded upon the film, FIG. 4(2), the waveforms when they are read out, FIG. 4(3), the timing or sync signals obtained by slicing the waveforms shown in FIG. 4(2) at a suitable level.

As described hereinbefore the optical digital signals recorded upon the film contain the timing or sync signals so that the adjacent digital signals are not required to be spaced apart from each other by a correct distance with a higher degree of accuracy.

Figure 6:
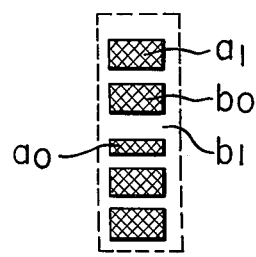
FIG. 6 shows the detail of a film upon which are recorded the information according to a second embodiment of the information recording system of the present invention.

In the second embodiment shown in FIG. 6, the optical digital signals are both the intensity-variable signals and the area- or width-variable signals. The digital information read out from the punched cards or paper tape are converted into the intensity-variable signals and also into the width-variable signals. Therefore both the digital information and the timing or sync signals are recorded as the dark and light images upon the microfilm. The digital information is also recorded upon the film in the form of the images whose widths are varied depending upon the logic "1" and "0".

The dark image with a greater width $a_1$ and the light image with a greater width $b_1$ represent the logic "1", and the dark image $a_0$ with a shorter width and the light image $b_0$ with a shorter width also represent the logic "0". In the instant embodiment the density of the light images $b_1$ and $b_0$ is equal to that of the base of the film, but it may be darker than that of the film.

In the instant embodiment the width of the images representing the logic "1" is selected to be two times the images representing the logic "0", but it will be understood that the ratio in width may be appropriately varied.

Figure 7:
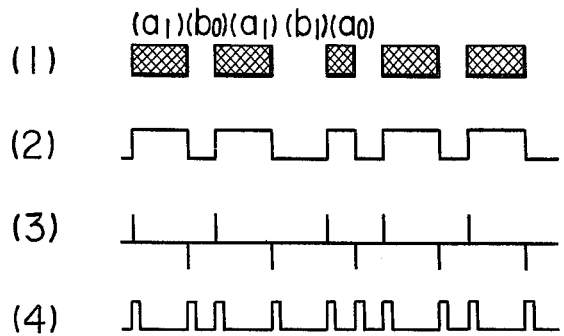
FIG. 7 shows the waveforms of the electrical output signals when the film shown in FIG. 6 is read out.

FIG. 7 shows the waveforms of the output signals when the optical digital signals shown in FIG. 6 are read out. FIG. 7(1) shows the optical digital signals recorded upon the film; FIG. 7(2), the waveforms of the output signals of the reader which reads the digital signals shown in FIG. 7(1); FIG. 7(3), the pulses obtained by differentiating the output signals shown in FIG. 7(2); and FIG. 7(4), the timing or sync pulses obtained by shaping the pulses shown in FIG. 7(3). As described hereinbefore, according to the present invention the digital information may be recorded at a higher density upon the film without leaving the space between the adjacent optical digital images. The optical digital signals recorded upon the film may be read out at a high speed, when the timing or sync signals are utilized, by the optical reader without improving the mechanical and electrical precessions thereof. In the embodiments of the present invention, the optical digital signals have been shown as being recorded in the direction of the width of the film, but it will be understood that they may be recorded in the longitudinal direction of the film.

I claim:

1. A micro-film, having thereon digital information comprising:
   a. a film having a base of a first density;
   b. the film having images of a first and a second optical density different from said first density and corresponding to the logic level of the digital information;
   c. the film having the dark and the light images indicated by said second and third densities for said digital information being arranged intermittently and in spaced apart relation along the recording direction of said digital information;
   d. the film having timing signals, for indicating the positional location of said dark and light images, recorded with a level common to said dark and light images representing said digital information.

2. A micro-film comprising:
   a. dark and light images having a first density and a second density representing the digital information arranged adjacently and alternately along the recording direction;
   b. said dark and light images have first and second widths different from each other, corresponding to the logic level of said digital information along the direction of recording; and
   c. timing information for indicating the location of said dark and light images being indicated by the boundary of said dark and light images.

3. An information recording system for recording digital information upon a micro-film comprising:
   a. a digital information source for generating digital information;
   b. a micro-film having a base of a first density;
   c. optical beam generating means for recording the information from said digital information source upon said micro-film;
   d. control means for controlling the brightness and the location of said optical beam from said optical beam generating means to record said digital information intermittently in the recording direction as dark and light images, which are different from said first density;
   said control means further including,
   i. intensity modulating means, connected to said optical beam generating means, for modulating said optical beam to first, second and third brightnesses different from each other, wherein the second brightness and the third brightness correspond to the digital information from said digital information source, and
   ii. deflecting means, operable in synchronism with said modulating means, for locating said optical beams along the recording direction so that said second or third brightness beams are alternately repeated with respect to said first brightness optical beam.

4. An information recording system in accordance with claim 3, wherein
   said control means includes beams for generating a series of repetitive signals, said repetitive signal generating means is connected to said modulating means and said deflecting means for modulating and deflecting said optical beams by said repetitive signal.

5. An information recording system in accordance with claim 4, wherein
   said repetitive signal generating means includes pulse generating means which generates pulses simultaneously with the generation of said digital information and a means for frequency dividing said pulses, said frequency dividing means being connected to said modulating means for modulating said optical beams intermittently to the second brightness and the third brightness by the frequency divided pulses.

6. An information recording system in accordance with claim 4, wherein
   said repetitive signal generating means includes pulse generating means which generates pulses simultaneously with the generation of said digital information and a means for frequency dividing said pulse, said frequency dividing means is connected to said modulating means for modulating said optical beam intermittently to the second brightness and the third brightness by the frequency divided pulse, and said pulse generating means is connected to said deflecting means for deflecting said optical beam by the pulses.

7. An information recording system in accordance with claim 6, wherein
   said deflecting means includes a first counter for counting said pulses and a micro-sawwave generator for moving said optical beam upon said micro-film surface toward the recording direction and/or normal thereto a micro-width and said first counter is connected to said pulse generating means so that the counter value of each of said pulses indicates the location of the deflection, and said sawwave generator is connected to said frequency divider so as to clearly indicate the deflected location of said optical beam.

8. An information recording system in accordance with claim 7, wherein
   a second counter is further included, and said first counter is provided for determining the location of said optical beam in the recording direction and for zero-resetting at a predetermined counter value, said second counter counting said zero-setting signals and outputs its counter value per every zero-resetting signal for changing the saw of the recording and reset at a predetermined counted value.

9. An information recording system in accordance with claim 7, wherein
   said optical beam generating means is a C.R.T., and said deflecting means includes means for determining the deflecting voltage of the electrical beam of said C.R.T. by the voltage output in response to the output of the first counter and the output from the micro-sawwave generator.

10. An information recording system in accordance with claim 3, wherein
    said control means includes driving means for moving said micro-film upon completion of the predetermined volume of the digital information on said micro-film and means for interrupting the generation of said digital information during the period when said micro-film is moving, and said driving means is connected to said deflecting means.

11. An information recording system in accordance with claim 3, wherein
    said digital information source includes readout means for reading out the digital information every time when the recording of a predetermined volume of said digital information on said medium is completed, buffer memory means connected to said readout means for temporarily storing said volume of the digital information and means for producing said stored information in time sequence synchronized with said modulation and said deflection.

12. An information recording method for recording digital information upon a micro-film comprising:
   a. a first step for generating onto said micro-film optical beams modulated to first, second and third brightness in the sequence of the generation of the digital information; wherein said second brightness and third brightness correspond to the logic level of said digital information;
   b. a second step for deflecting said optical beam synchronized with the generation of said optical beam; wherein said deflection determines the location of said optical beams of said second brightness and third brightness with respect to said first brightness alternatively and repetitively in the direction of the recording;
   c. a third step for recording said modulated and deflection optical beams in the form of dark and light images upon said microfilm having a base of a first density by projecting and exposing thereon, wherein said dark and light images have a second and a third density corresponding to said second brightness and said third brightness which are different from the first density, and said images whose density levels are common to said dark and light levels are recorded intermittently in the direction of recording for indicating the timing signal.

13. An information recording method in accordance with calim 12, wherein
   said first step further includes, generating a series of repetitive signals simultaneously with the generation of said digital information, and modulating said optical beam in synchronism with said repetitive signal, said second step further includes, modulating said optical beam by said repetitive signal.

14. An information recording method in accordance with claim 13, wherein
   said repetitive signal is a pulse signal, and said first step includes, brightness modulating said optical beam to the second brightness and the third brightness by frequency dividing the pulse of said pulse signals, and the second step further includes, deflecting said optical beam by said pulse signal.

15. An information recording method in accordance with claim 14, wherein
   said second step includes counting said pulses in sequence and in response to the counted value of said pulses dividing the location of said beam to be deflected and synchronizing with the generation of the optical beam having said second brightness and third brightness changes said optical beams of the second and third brightness a micro-width on the surface of microfilm toward the recording direction and/or normal thereto.

16. An information recording method in accordance with claim 12, wherein
   the first step includes, reading out the digital information recorded medium every time a predetermined volume of recording has been completed, storing said readout digital information temporarily, and generating the stored digital information in time sequence by the deflecting signal.

17. An information recording method in accordance with claim 12, wherein
   the third step includes, removing said micro-film and interrupting the generation of said digital information simultaneously with the completion of the recording of a predetermined amount of digital information.

18. An information recording method for recording digital information upon a micro-film, comprising:
   a. a first step for generating an optical beam modulated to a first brightness and to a second brightness in sequence corresponding to the generation of digital information, wherein the optical beams having the first brightness and the second brightness are generated alternatively;
   b. a second step for deflecting said optical beams synchronized with the generation of said optical beams, wherein said deflection positioning of said optical beams in the recording direction have different first and second deflection widths;
   c. a third step for exposing said modulated and deflected optical beams upon said micro-film and recording thereon as dark and light images, wherein, said dark and light imges have their recording width corresponding to said first and second deflected width and the boundary of the dark and the light images are recorded adjacently in the direction of recording so as to indicate timing information.

* * * * *

UNITED STATES PATENT AND TRADEMARK OFFICE
CERTIFICATE OF CORRECTION

PATENT NO. : 3,961,315
DATED : June 1, 1976
INVENTOR(S) : NOBORU YOKOYAMA

It is certified that error appears in the above-identified patent and that said Letters Patent are hereby corrected as shown below:

First page, bibliographic data, below INID Code "[63]", insert:

--[30]     Foreign Application Priority Data

September 26, 1972   Japan ........... 47/96473   --

Column 2, line 5, before "recording", delete "a".
Column 7, line 25, change "flection" to -- flected --.

Signed and Sealed this

Nineteenth Day of October 1976

[SEAL]

Attest:

RUTH C. MASON
*Attesting Officer*

C. MARSHALL DANN
*Commissioner of Patents and Trademarks*